United States Patent [19]
Asada

[11] Patent Number: 5,120,284
[45] Date of Patent: Jun. 9, 1992

[54] AUTOMATIC TRANSMISSION

[75] Inventor: Toshiyuki Asada, Susono, Japan

[73] Assignee: Toyota Jidosha Kabushiki Kaisha, Toyota, Japan

[21] Appl. No.: 474,511

[22] Filed: Feb. 2, 1990

[30] Foreign Application Priority Data

Feb. 3, 1989 [JP] Japan .................................. 1-25321
Jul. 19, 1989 [JP] Japan .................................. 1-186991

[51] Int. Cl.$^5$ .................................................. F16H 57/10
[52] U.S. Cl. ..................................................... 475/278
[58] Field of Search ............... 475/275, 277, 278, 284, 475/285, 289, 297

[56] References Cited

U.S. PATENT DOCUMENTS

| | | | |
|---|---|---|---|
| 3,811,343 | 5/1974 | Mori et al. | 475/285 |
| 3,863,524 | 2/1975 | Mori et al. | 475/287 X |
| 4,233,861 | 11/1980 | Gaus et al. | 475/56 |
| 4,660,439 | 4/1987 | Hiraiwa | 475/278 X |
| 4,774,856 | 10/1988 | Hiraiwa | 475/285 |
| 4,939,955 | 7/1990 | Sagano | 475/278 |
| 4,963,124 | 10/1990 | Takahashi et al. | 475/278 |

FOREIGN PATENT DOCUMENTS

| | | | |
|---|---|---|---|
| 0121259 | 10/1984 | European Pat. Off. | |
| 0164553 | 12/1984 | European Pat. Off. | |
| 3511180 | 10/1985 | Fed. Rep. of Germany | |
| 51132058 | 10/1979 | Japan | |
| 26645 | 2/1984 | Japan | 475/285 |
| 60-57036 | 4/1985 | Japan | |
| 60-65942 | 4/1985 | Japan | |
| 60-65943 | 4/1985 | Japan | |
| 60-88249 | 5/1985 | Japan | |
| 60-88251 | 5/1985 | Japan | |
| 60-88252 | 5/1985 | Japan | |

Primary Examiner—Dwight Diehl
Attorney, Agent, or Firm—Cushman, Darby & Cushman

[57] ABSTRACT

An automatic transmission wherein a gear train is constituted by three single pinion type planetary gear sets, provided with a first planetary gear set having a first sun gear, a first ring gear, and a first carrier holding pinion gears meshing with the first sun gear and the first ring gear, a second planetary gear set having a second sun gear, a second ring gear which is normally or selectively connected with the first carrier, and a second carrier holding pinion gears meshing with the second sun gear and the second ring gear, a third planetary gear set having a third sun gear normally or selectively connected to the second carrier, a third ring gear which is continuously connected with the first carrier, and a third carrier holding pinion gears meshing with the third sun gear and the third ring gear and connected to the output shaft, a first clutch means which selectively connects the input shaft and the first ring gear, a second clutch means which selectively connects the first sun gear and the second carrier, a third clutch means which selectively connects the input shaft and the first sun gear, a fourth clutch means which selectively connects the first sun gear and the second sun gear, a first brake means which selectively stops the rotation of at least the third sun gear among the second carrier and the third sun gear, a second brake means which selectively stops the rotation of the first sun gear, and a third brake means which selectively stops the rotation of the second sun gear, at least five forward speeds and one reverse speed being settable as transmission stages.

6 Claims, 7 Drawing Sheets

FIG. 6

|      | K1 | K2 | K3 | K4 | K6 | B1 | B2 | B3 | B4 |
|------|----|----|----|----|----|----|----|----|----|
| 1st  | O  |    |    | O  | O  | O  |    |    | *  |
|      | O  |    |    | O  | O  | *  |    |    | O  |
|      | O  |    |    | O  | *  | O  |    |    | O  |
| 2nd  | O  | O  |    |    | O  | O  | *  |    | *  |
|      | O  | O  |    |    | O  | *  | *  |    | O  |
|      | O  | O  |    |    | O  | *  | O  |    | *  |
|      | O  | O  |    |    | *  | O  | *  |    | O  |
|      | O  | *  |    |    | *  | O  | O  |    | *  |
|      | O  | *  |    |    | O  | *  | O  |    | O  |
|      | O  |    |    | O  |    | O  | *  | O  |    |
|      | O  |    |    | *  |    | O  | O  | *  |    |
| 2.5th| O  |    |    | O  | O  |    | O  | *  |    |
|      | O  |    |    | O  | O  |    | *  | O  |    |
|      | O  |    |    | *  | O  |    | O  | O  |    |
| 3rd  | O  | *  | O  | *  |    | O  |    |    |    |
|      | O  | O  | *  | O  |    | O  |    |    |    |
|      | *  | O  | O  | O  |    | O  |    |    |    |
|      | O  |    | O  |    |    | O  |    | *  |    |
|      | O  |    | O  |    | *  | O  |    |    | *  |
|      | O  |    | O  |    | O  | *  |    |    | O  |
| 3.5th| O  |    | O  |    | O  |    |    | O  |    |
| 4th  | O  | O  | O  | *  | O  |    |    |    |    |
|      | O  | O  | *  | O  | O  |    |    |    |    |
|      | O  | *  | O  | O  | O  |    |    |    |    |
|      | *  | O  | O  | O  | O  |    |    |    |    |
| 5th  |    | O  | O  |    | O  |    |    | O  |    |
| Rev  |    |    | O  | O  | O  | O  |    |    | *  |
|      |    |    | O  | O  | O  | *  |    |    | O  |
|      |    |    | O  | O  | *  | O  |    |    | O  |

AUTOMATIC TRANSMISSION

BACKGROUND OF THE INVENTION

1. Field of the Invention

The present invention relates to an automatic transmission for a vehicle, and more particularly relates to an automatic transmission wherein three single pinion type planetary gear sets are used to construct a gear train.

2. Description of the Related Art

As is known, planetary gear sets have three components: a sun gear, a ring gear, and a carrier for holding a pinion gear meshing with them. One of these components is used as an output member, another is used as an input member and the other element is held stationary, whereby the input rotation may be increased in output speed, reduced in speed in the forward direction, or reduced in speed in the reverse direction. Therefore, in general, in the related art, a plurality of planetary gear sets are combined to construct a gear train for an automatic transmission. In this case, the transmission ratio obtained varies depending on the method of combination of the planetary gear sets, the value of the gear ratio of the planetary gear sets (ratio of number of teeth of sun gear and ring gear), and whether use is made of the single pinion type planetary gear set or use is made of the double pinion type planetary gear set. Not all of the combinations, however, may be used in practice. Due to various conditions such as the mountability in the vehicle, the feasibility of manufacture, the gear change characteristics, and the drive performance sought, there are limited gear trains which can be used in practice. In other words, a massive number of constructions of gear trains are possible through various combinations of the planetary gear sets and settings of the gear ratios, so creation of one satisfying the conditions sought for an automatic transmission for a vehicle is accompanied with great difficulty.

In the past, proposals have been made of numerous automatic transmissions conceived of under this situation. Among these, an automatic transmission using three single pinion type planetary gear sets to construct a gear train has been disclosed, for example, in Japanese Published Unexamined Patent Application Nos. 60-88252 and 60-57036.

The automatic transmission disclosed in Japanese Published Unexamined Patent Application No. 60-88252 is constructed of a combination of three single pinion planetary gear sets and can set five forward speeds and one reverse speed as transmission stages. If, to prevent a remarkable reduction in the drive power of the vehicle before and after gear shifts, the gear ratio of the planetary gear sets is set to give a relationship where the gear ratio of the transmission stages is close to an equal ratio series, it is necessary to set the gear ratio of one of the planetary gear sets to a remarkably high value. As a result, it is inevitable to make the outer diameter of the planetary gear set large. Further, if the gear ratios of the opposing planetary gear sets are set so that the outer diameters do not increase particularly greatly, the relationship will not be one where the gear ratios of the transmission stages are close to the equal ratio series and there is the problem of causing the inconvenience of a deterioration in the power performance of the vehicle.

In the automatic transmission disclosed in Japanese Published Unexamined Patent Application No. 60-57036, the sun gear of a first planetary gear set and the sun gear of a second planetary gear set are normally or selectively connected, the sun gear of the first planetary gear set and the carrier of the second planetary gear set are connected via a clutch, the ring gear of the second planetary gear set and the ring gear of a third planetary gear set are connected, the carrier of the first planetary gear set is connected to these ring gears and the carrier of the second planetary gear set and the sun gear of the third planetary gear set are connected via a clutch. An input shaft is connected via a clutch to the sun gear of the first planetary gear set and the sun gear of the second planetary gear set, which are mutually connected themselves, while they are connected via another clutch to the ring gear of the first planetary gear set. An output shaft is connected to the carrier of the third planetary gear set. As a brake means for stopping the rotation, provision is made of a brake which holds stationary the mutually connected sun gear of the first planetary gear set and the sun gear of the second planetary gear set and a brake which holds stationary the sun gear of the third planetary gear set. In the automatic transmission according to Japanese Published Unexamined Patent Application No. 60-57036, in the first gear, the brake for holding stationary the sun gear of the third planetary gear set is engaged and simultaneously the clutch connecting the carrier of the second planetary gear set to the sun gear is engaged, whereby the rotation of the carrier of the second planetary gear set is inhibited. Further, even in reverse gear, the carrier of the second planetary gear set is held stationary in the same way. The transmission ratio between the first gear and reverse gear becomes a similar value.

Note that Japanese Published Unexamined Patent Application No. 60-57036 mentioned above shows by a skeleton view a construction wherein a one-way clutch is inserted between the carrier of the second planetary gear set and the case, but a corresponding operation table for the same is not shown and, further, no explanation is made of the settable transmission stage, so it would be considered that transmission stages would be set in the same way in a construction where the one-way clutch is additionally provided as with the other examples disclosed in this publication.

Therefore, in the automatic transmission disclosed in Japanese Published Unexamined Patent Application No. 60-57036, to stop the rotation of the carrier of the second planetary gear set, the carrier is connected by the clutch to the sun gear of the third planetary gear set and the brake for holding stationary the sun gear of the third planetary gear set is engaged with a brake. As a result, a large torque is applied to the clutch connecting the carrier and sun gear, so the clutch must be made large in capacity. Along with this, there is the problem that the automatic transmission becomes larger in size. Further, in the automatic transmission disclosed in Japanese Published Unexamined Patent Application No. 60-57036, in the second gear or the second' gear or third' gear, the sun gear of the first planetary gear set is held stationary, but in this case, the brake for holding stationary the sun gear of the second planetary gear set is engaged and the sun gear of the first planetary gear set is engaged with that sun gear by a clutch, so a large torque is applied to the clutch in these transmission stages and, as a result, the clutch must be made large in capacity. This is a problem in that it becomes a factor enlarging the size of the automatic transmission.

SUMMARY OF THE INVENTION

One of the objects of the present invention is the provision of an automatic transmission which uses three planetary gear sets to construct a gear train, which can set at least five forward speeds and one reverse speed as transmission stages, and which is small in size and light in weight.

Another object of the present invention is to reduce the torque acting on the frictional engagement means constituting the clutch means and brake means.

Still another object of the present invention is to raise the degree of freedom of selection of the clutch means and brake means to be engaged for setting a predetermined transmission stage.

To achieve these objects, the automatic transmission of the present invention is provided with a first planetary gear set having a first sun gear, a first ring gear, and a first carrier holding pinion gears meshing with the first sun gear and the first ring gear, a second planetary gear set having a second sun gear, a second ring gear which is normally or selectively connected to the first carrier, and a second carrier holding pinion gears meshing with the second sun gear and the second ring gear, a third planetary gear set having a third sun gear normally or selectively connected to the second carrier, a third ring gear which is normally connected to the first carrier, and a third carrier holding pinion gears meshing with the third sun gear and the third ring gear and normally connected to an output shaft, a first clutch means which selectively connects an input shaft and first ring gear, a second clutch means which selectively connects the first sun gear and second carrier, a third clutch means which selectively connects the input shaft and the first sun gear, a fourth clutch means which selectively connects the first sun gear and second sun gear, a first brake means which selectively stops the rotation of at least the third sun gear out of the second carrier and the third sun gear, a second brake means which selectively stops the rotation of the second sun gear, at least five forward speeds and one reverse speed being settable as transmission stages.

Further, in the automatic transmission of the present invention, further provision may be made of another clutch means for selectively connecting the second carrier and the third carrier and another brake means for independently holding stationary the second carrier.

When providing these other clutch means and brake means, the afore-mentioned second brake means may be eliminated and another clutch means provided which selectively connects the first carrier to the second ring gear and third ring gear.

The above and further objects and features of the present invention will become more apparent from the following detailed description when the same is read in connection with the accompanying drawings. It is expressly understood, however, that the drawings are for the purpose of illustration only and are not intended as a definition of the limits of the invention.

DESCRIPTION OF THE PREFERRED EMBODIMENTS

Figure 1:
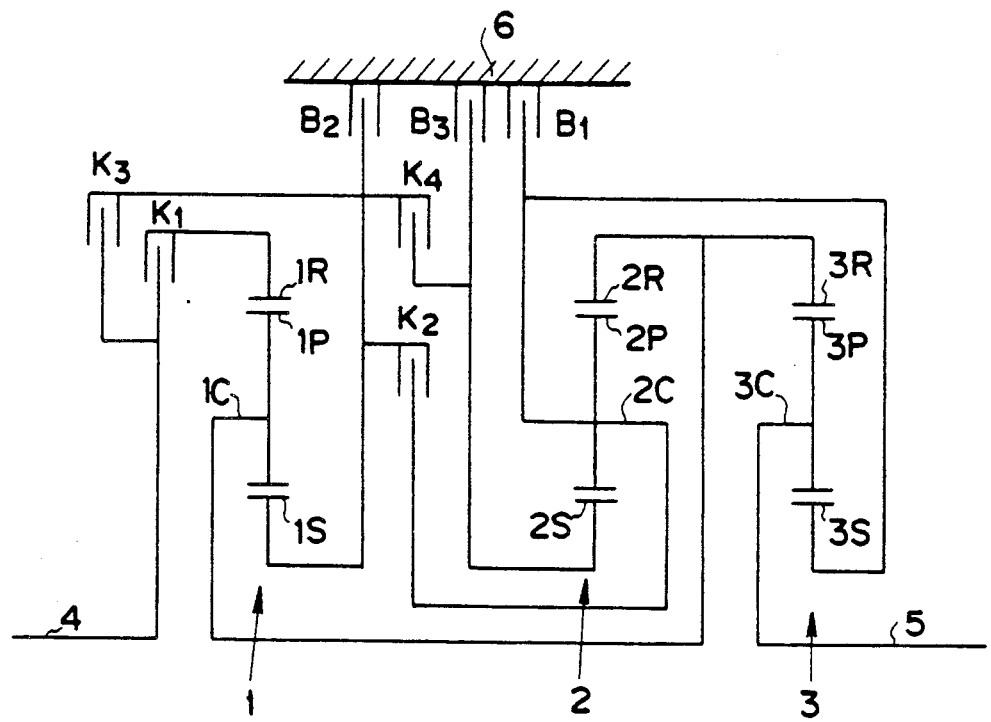
FIGS. 1 to 5 and FIGS. 7 to 13 are skeleton diagrams respectively showing embodiments according to the present invention in principle, and FIG. 6 a general operation table.

In FIG. 1, the three planetary gear sets 1, 2, and 3 constituting the gear train are all single pinion type planetary gear sets.

That is, the planetary gear sets 1, 2, and 3 are constituted by sun gears 1S, 2S, and 3S, ring gears 1R, 2R, and 3R arranged concentrically with the sun gears 1S, 2S, and 3S, and carriers 1C, 2C, and 3C which hold pinion gears 1P, 2P, and 3P which mesh with the sun gears 1S, 2S, and 3S and the ring gears 1R, 2R, and 3R as main components. The three components of the carrier 1C of the first planetary gear set 1, the ring gear 2R of the second planetary gear set 2, and the ring gear 3R of the third planetary gear set 3 are connected so as to turn as one, and the carrier 2C of the second planetary gear set 2 and the sun gear 3S of the third planetary gear set 3 are connected so as to turn as one. On the other hand, a fourth clutch means K4 is provided between the sun gear 1S of the first planetary gear set 1 and the sun gear 2S of the second planetary gear set 2, with these sun gears 1S and 2S being selectively connected. Further, a second clutch means K2 is provided between the sun gear 1S of the first planetary gear set 1 and the sun gear 2C of the second planetary gear set 2, with the second clutch means K2 being used to selectively connect the sun gear 1S of the first planetary gear set 1 and the carrier 2C of the second planetary gear set 2.

Note that as the connecting structure of the above components, use may be made of a connecting structure used for general automatic transmissions such as a quill shaft, solid shaft, or suitable connecting drum.

An input shaft 4 is connected to the engine (not shown) through a power transmission means (not shown) such as a torque converter or a fluid coupling. Between the input shaft 4 and the ring gear 1R of the first planetary gear set 1 is provided a first clutch means K1 which selectively connects the two. Further, between the input shaft 4 and the sun gear 1S of the first planetary gear set 1 is provided a third clutch means K3 which selectively connects the two.

The above clutch means K1, K2, K3, and K4 selectively connect the above-mentioned members and release the connections. For example, use may be made of a wet type multi-disc clutch which is engaged and released by a mechanisms generally adopted in the prior automatic transmissions such as a hydraulic pressure servo mechanism, a one-way clutch, or such wet type multi-disc clutches and one-way clutches arranged in series or in parallel, as needed. Note that in actual use, there are limitations on the deployment of various constitutional members, so suitable intermediate members such as connecting drums may of course be inserted as connecting members for the clutch means K1, K2, K3, and K4.

A first brake means B1 which selectively prevents rotation of the mutually connected sun gear 2C of the second planetary gear set 2 and the sun gear 3S of the third planetary gear set 3 is provided between the carrier 2C and the sun gear 3S and the transmission casing (below, simply referred to as a casing) 6. Further, a second brake means B2, which selectively prevents the rotation of the sun gear 1S of the first planetary gear set 1, is provided between the sun gear 1S and the casing 6. Further, a third brake means B3, which selectively prevents the rotation of the sun gear 2S of the second planetary gear set 2, is provided between the sun gear 2S and the casing 6. These brake means B1, B2 and B3 may be wet type multi-disc brakes, band brakes driven by hydraulic servo mechanisms, one-way clutches or combinations of the same, used in the prior automatic transmissions. In actual use, suitable connecting members may of course be interposed between the brake means B1, B2, and B3 and the elements to be held stationary by the brake means B1, B2, and B3 or the casing 6.

An output shaft 5 which transmits the rotation to the propeller shaft or counter gear (both not shown) is connected to the carrier 3C of the third planetary gear set 3.

In the automatic transmission constructed as shown above, gear changes of five forward speeds and one reverse speed or seven forward speeds and one reverse speed are possible. These transmission stages are achieved by engaging the clutch means K1, K2, K3 and K4 and the brake means B1, B2, and B3 as shown in Table 1. Note that Table 1 shows the transmission ratios f the transmission stages together with specific values of the same. These specific values are those in the case of the gear ratios P1, P2, and P3 of the planetary gear sets 1, 2, and 3 of P1=0.456, P2=0 510, and P3=0.398. Further, the small circle marks in Table 1 show the engagement state and the x marks the release state. Below, the explanation will be made first for the case of setting five forward speeds and one reverse speed. Then an explanation will be made of two transmission stages which may be added.

set 2 rotate forwardly, so the carrier 3C rotates forwardly at a lower speed than the input shaft 4. In the end, the output shaft 5 connected to the carrier 3C of the third planetary gear set 3 turns forwardly at a lower speed than the input shaft 4, thus giving the first gear in the forward gears, having the largest transmission ratio. The transmission ratio is, as shown in Table 1, given by $(1+P3)+P1(1+P2)(1+P3)/P2$. The specific figure is 3.285. In this case, there is no circulation of power.

Second Gear

In addition to the first clutch means K1, at least two of the second clutch means K2, first brake means B1, or second brake means B2 are engaged. That is, instead of the fourth clutch means K4 in the first gear state, the second clutch means K2 is engaged or the second brake means B2 is engaged and further both of the second clutch means K2 and the second brake means B2 are engaged. Therefore, for example, in case of engaging the first clutch means K1 and the first and second brake means B1 and B2, in the first planetary gear set 1, since the ring gear 1R rotates together with the input shaft 4 in a state with the sun gear 1S held stationary, the carrier 1C rotates forwardly at a lower speed than the input shaft 4. This is transmitted to the ring gear 3R of the third planetary gear set 3. In the third planetary gear set 3, since the ring gear 3R turns forwardly in a state with the sun gear 3S held stationary, the carrier 3C rotates forwardly at a lower speed than the ring gear 3R. Note that in this case, the second planetary gear

TABLE 1

| | Clutch means | | | | Brake means | | | Gear ratio | |
|---|---|---|---|---|---|---|---|---|---|
| | K1 | K2 | K3 | K4 | B1 | B2 | B3 | (P1 = 0.456, P2 = 0.510, P3 = 0.398) | |
| 1st | ○ | x | x | ○ | ○ | x | x | $1+P3+(P1/P2)(1+P2)(1+P3)$ | 3.285 |
| 2nd | ○ | x* | x | x | ○* | ○* | x | $(1+P1)(1+P3)$ | 2.035 |
| 3rd | ○ | x | ○ | x | ○ | x | x | $1+P3$ | 1.398 |
| 4th | ○*1 | ○*1 | ○*1 | ○*1 | x | x | x | 1 | 1.000 |
| 5th | x | ○ | ○ | x | x | x | ○ | $(1+P3)/(1+P2+P3)$ | 0.733 |
| Rev | x | x | ○ | ○ | x | x | x | $-(1+P3)/P2$ | −2.741 |
| 2.5th | ○ | x | x | x*2 | x | ○*2 | ○*2 | $[(1+P1)(1+P2)(1+P3)]/[1+P2+P3]$ | 1.611 |
| 3.5th | ○ | x | ○ | x | x | x | ○ | $[(1+P1)(1+P3)]/[1+P2-P3]$ | 1.106 |

*at least two of the clutch means and brake means are engaged.
*1 at least three of the clutch means are engaged.
*2 Two or more of the three may be engaged.

First Gear

The first clutch means K1 and fourth clutch means K4 and the first brake means B1 are engaged. That is, the ring gear 1R of the first planetary gear set 1 is connected with the input shaft 4, the sun gear 1S of the first planetary gear set 1 and the sun gear 2S of the second planetary gear set 2 are connected by the fourth clutch means K4, and the carrier 2C of the second planetary gear set 2 and the sun gear 3S of the third planetary gear set 3 connected to the same are held stationary. Therefore, in the first planetary gear set 1, the ring gear 1R rotates together with the input shaft 4, whereby the carrier 1C turns forwardly (turns in the same direction as the input shaft 4, same below), while the sun gear 1S turns rearwardly (turns in the direction opposite to the input shaft 4, same below). As a result, in the second planetary gear set 2, the ring gear 2R is connected to the carrier 1C of the first planetary gear set 1 and the carrier 2C is held stationary, whereby the sun gear 2S turns rearwardly together with the sun gear 1S of the first planetary gear set 1. In the third planetary gear set 3, the sun gear 3S is held stationary and the ring gear 3R connected to the sun gear 1S of the first planetary gear set 1 and the ring gear 2R of the second planetary gear 2 enters a state of nonconnection of the sun gear 2S to the input shaft 4 and the casing 6, so there is no particular speed increase or reduction action. As a result, the rotation of the input shaft 4 is transmitted to the output shaft 5, while being reduced in speed by the first planetary gear set 1 and the third planetary gear set 3. The transmission ratio, as shown in Table 1, is given by $(1+P1)(1+P3)$. The specific value is 2.035. In this case too, there is no circulation of the power.

Further, if, in addition to the first clutch means K1, the second clutch means K2 and second brake means B2 are engaged, the second clutch means K2 connects the carrier 2C of the second planetary gear set 2 and the sun gear 3S of the third planetary gear set 3 to the sun gear 1S of the first planetary gear set 1 held stationary by the second brake means B2 and holds stationary the same, so the second clutch means K2 acts as a brake and the second gear is set in the same way as above.

Third Gear

The first clutch means K1, the third clutch means K3, and the first brake means B1 are engaged. That is, the second gear is set by engaging the first clutch means K1, the first brake means B1, and the second clutch means K2 or second brake means B2. From this state, the third clutch means K3 is engaged in place of the second clutch means K2 or second brake means B2. Therefore, in the first planetary gear set 1, both the ring gear 1R and the sun gear 1S rotate together with the input shaft 4, so everything rotates as one together with the input shaft 4, and the rotation of the carrier 1C is transmitted to the ring gear 3R of the third planetary gear set 3. In the third planetary gear set 3, the sun gear 3S is held stationary, so the carrier 3C is reduced in speed and rotates forwardly with respect to the ring gear 3R. Note that in the second planetary gear set 2, the sun gear 2S is in a nonconnected state to the input shaft 4 and the casing 6 in the same way as the case of second gear, so there is no particular speed increase or reduction action. As a result, substantially, only the third planetary gear set 3 performs a speed reduction action and the rotation of the input shaft 4 is transmitted to the output shaft 5 in reduced speed. The transmission ratio of the same is, as shown in Table 1, given by $(1+P3)$. The specific value is 1.398. Further, no power circulation is caused.

Fourth Gear

At least three of the first to fourth clutch means K1, K2, K3, and K4 are engaged and the brake means B1 and B2 are released. That is, for example, in the state of third gear, instead of the first brake means B1, the second clutch means K2 is engaged or the fourth clutch means K4 is engaged. In this case, if the first to third clutch means K1 to K3 are engaged, the first, third, and the fourth clutch means K1, K3, and K4 are engaged, or another three or more clutch means are engaged, the gear train as a whole acts as one and rotates together with the input shaft 4 and no speed increase or reduction action is caused, so the transmission ratio becomes "1". For example, further, by making the first to third clutch means K1, K2, and K3 engage, the drive power from the input shaft 4 can be transmitted to the output shaft 5 without causing power circulation.

Fifth Gear

The second and third clutch means K2 and K3 and the third brake means B3 are engaged. That is, in the state of the fourth gear mentioned above, the first to third clutch means K1 to K3 are engaged and from that state the third brake means B3 instead of the first clutch means K1 is engaged. Therefore, by the engagement of the second clutch means K2, the carrier 2C of the second planetary gear set 2 and the sun gear 3S of the third planetary gear set 3 are connected to the input shaft 4 and, since the sun gear 2S of the second planetary gear set 2 is held stationary, in the second planetary gear set 2, the ring gear 2R rotates forwardly at a lower speed than the input shaft 4. This is transmitted to the ring gear 3R of the third planetary gear set 3. As a result, in the third planetary gear set 3, in the state where the sun gear 3S rotates forwardly together with the input shaft 4, the ring gear 3R rotates forwardly at a higher speed than the input shaft 4, so the carrier 3C rotates forwardly at a speed between the sun gear 3S and the ring gear 3R. Note that in the first planetary gear set 1, the ring gear 1R is in a nonconnected state to the input shaft 4, so there is no particular speed increase or reduction action, but the sun gear 1S, as mentioned earlier, acts as a transmission member for connecting the carrier 2C of the second planetary gear set 2 to the input shaft 4. That is, in this case, the carrier 2C of the second planetary gear set 2 and the sun gear 3S of the third planetary gear set 3 are connected indirectly to the input shaft 4 and the planetary gear sets 2 and 3 perform a speed increase or reduction action to increase the speed of the rotation of the input shaft 4 and transmit the same to the output shaft 5, resulting in overdrive, i.e., the forward gear. Further, the carrier 2C of the second planetary gear set 2 and the sun gear 3S of the third planetary gear set 3 are connected to the input shaft 4 via the sun gear 1S of the first planetary gear set 1 without direct connection to the input shaft 4. Along with this, in the first planetary gear set 1, the rotational speed of the sun gear 1S and the relative rotational speed with respect to the carrier 1C of the pinion gear 1P become smaller, which is advantageous from the viewpoint of durability. The transmission ratio in this case is, as shown in Table 1, given by $(1+P3)/(1+P2+P3)$. The specific value is 0.733. Further, there is no power circulation in this case either.

Reverse

The third and fourth clutch means K3 and K4 and the first brake means B1 are engaged. That is, the sun gear 2S of the second planetary gear set 2 and the sun gear 1S of the first planetary gear set 1 are connected to the input shaft 4 and the carrier 2C of the second planetary gear set 2 and the sun gear 3S of the third planetary gear set 3 are held stationary. In this case, the ring gear 1R of the first planetary gear set 1 is in a nonconnected state to the input shaft 4, so in the same way as the case of the fifth gear, the first planetary gear set 1 does not particularly contribute to the speed increase or reduction action. Further, in the second planetary gear set 2, the sun gear 2S rotates together with the input shaft 4 in the state where the carrier 2C is held stationary, so the ring gear 2R rotates rearwardly at a lower speed than the input shaft 4. This is transmitted to the ring gear 3R of the third planetary gear set 3. Further, in the third planetary gear set 3, the ring gear 3R rotates rearwardly in the state where the sun gear 3S is held stationary, so the carrier 3C rotates rearwardly at a further low speed. That is, in this case, the rotation of the input shaft 4 is transmitted to the output shaft 5 being reduced in speed and rotating rearwardly by the second planetary gear set 2 and the third planetary gear set 3, giving the reverse gear. The transmission ratio in this case is, as shown in Table 1, given by $-(1+P3)/P2$. The specific value is $-2.741$. Note that in this case too, there is no circulation of the power.

As will be clear from the description above regarding the forward first to fifth speeds and the reverse speed of the transmission stages, in the automatic transmission shown in FIG. 1, when setting the five forward speeds and the one reverse speed, it is possible to make the transmission ratio of the forward speeds close to geometric progression, so there is no remarkable drop in the drive power before and after the gear change and the power characteristics of the vehicle can be made excellent. Further, it is possible to make the gear ratios of the planetary gear sets 1, 2, and 3 suitable values of about 0.39 to 0.51, so it is possible to construct the automatic transmission using mainly the three single pinion type planetary gear sets without inviting an increase in the diameter of the planetary gear sets and therefore it is possible to make a compact automatic transmission. Further, as stated in the explanation of the transmission stages, in changing to another adjoining transmission stage, it is sufficient to release one of the engagement means and engage the other engagement means, that is, it is possible to change the speed in the forward speeds by switching between two engagement means, so the control for the transmission is easy. At the same time, this is advantageous for the improvement of the shock. Further, since there is no power circulation, the transmission efficiency of the drive power is excellent and, further, the relative rotational speed of the pinion gear with respect to the carrier is low, the load torque of the gears and the engagement means is small, and the rotational speed of the gears is low, so it is possible to make an extremely durable, compact automatic transmission. Further, it is possible to set the transmission ratio of the overdrive gear to 0.733 or so and improve the power performance, fuel consumption, and quietness under high speed driving, and further it is possible to set the transmission ratio of the reverse speed at −2.741 or so and ensure sufficient drive power. Further, the input shaft 4 and output shaft 5 may be placed on the same axial line, so it is possible to make an automatic transmission suited for a front engine, rear wheel drive automobile.

In the construction shown in FIG. 1, it is possible to set two transmission stages in addition to the above transmission stages. The values of the transmission ratios of the two transmission stages are a value between second gear and third gear and a value between third gear and fourth gear. These are shown as the 2.5th gear and the 3.5th gear in the lower rows of Table 1.

2.5th Gear

This transmission stage corresponds to a transmission stage between the afore-mentioned second gear and third gear where the first clutch means K1 and the second brake means B2 and further the third brake means B3 are engaged. That is, the ring gear 1R of the first planetary gear set 1 is connected to the input shaft 4, and the sun gear 1S of the first planetary gear set 1 and the sun gear 2S of the second planetary gear set 2 are held stationary. Therefore, in the first planetary gear set 1, since the ring gear 1R rotates forwardly together with the input shaft 4 in the state with the sun gear 1S held stationary, the carrier 1C rotates forwardly at a lower speed than the input shaft 4. This is transmitted to the ring gears 2R and 3R of the second planetary gear set 2 and the third planetary gear set 3. Further, in the second planetary gear set 2, since the sun gear 2S is held stationary, the ring gear 2R rotates forwardly at a lower speed than the input shaft 4, whereby the carrier 2C rotates forwardly at a further lower speed. This is transmitted to the sun gear 3S of the third planetary gear set 3. As a result, in the third planetary gear set 3, the ring gear 3R rotates forwardly at a lower speed than the input shaft 4 and the sun gear 3S rotates normally at a further lower speed, so the carrier 3C and the output shaft 5 connected to the same rotate forwardly at a lower speed than the input shaft 4. That is, the planetary gear sets 1, 2, and 3 perform speed reduction actions to reduce the rotation of the input shaft 4 and transmit the same to the output shaft 5. The value of the transmission ratio is, as shown in Table 1, given by $$[(1+P1)(1+P2)(1+P3)]/(1+P2+P3).$$

The specific value is 1.611. In this case, too, there is no circulation of power.

3.5th Gear

This transmission stage corresponds to one between the third gear and fourth gear where the first and the third clutch means K1 and K3 and the third brake means B3 are engaged. That is, the ring gear 1R and sun gear 1S of the first planetary gear set 1 are connected to the input shaft 4 and the sun gear 2S of the second planetary gear set 2 is held stationary. Therefore, in the first planetary gear set 1, the two elements rotate together with the input shaft 4, so they all act as one and rotate forwardly at an equal speed with the input shaft 4. Along with this, the ring gears 2R and 3R of the second planetary gear set 2 and the third planetary gear set 3 rotate forwardly at an equal speed with the input shaft 4. Further, in the second planetary gear set 2, the ring gear 2R rotates forwardly at an equal speed with the input shaft 4 in a state with the sun gear 2S held stationary, so the carrier 2C rotates forwardly at a lower speed compared with the input shaft 4. This is transmitted to the sun gear 3S of the third planetary gear set 3. As a result, in the third planetary gear set 3, the sun gear 3S rotates forwardly at a lower speed than the input shaft 4 in a state where the ring gear 3R is rotating forwardly at an equal speed with the input shaft 4, so the carrier 3C and the output shaft 5 connected to the same rotate forwardly at a speed reduced by the second planetary gear set 2 and the third planetary gear set 3 with respect to the input shaft 4. Therefore, the transmission ratio is, as shown in Table 1, given by $[(1+P2)(1+P3)]/(1+P2+P3)$. The specific value is 1.106. In this case too, there is no circulation of the power.

Figure 2:
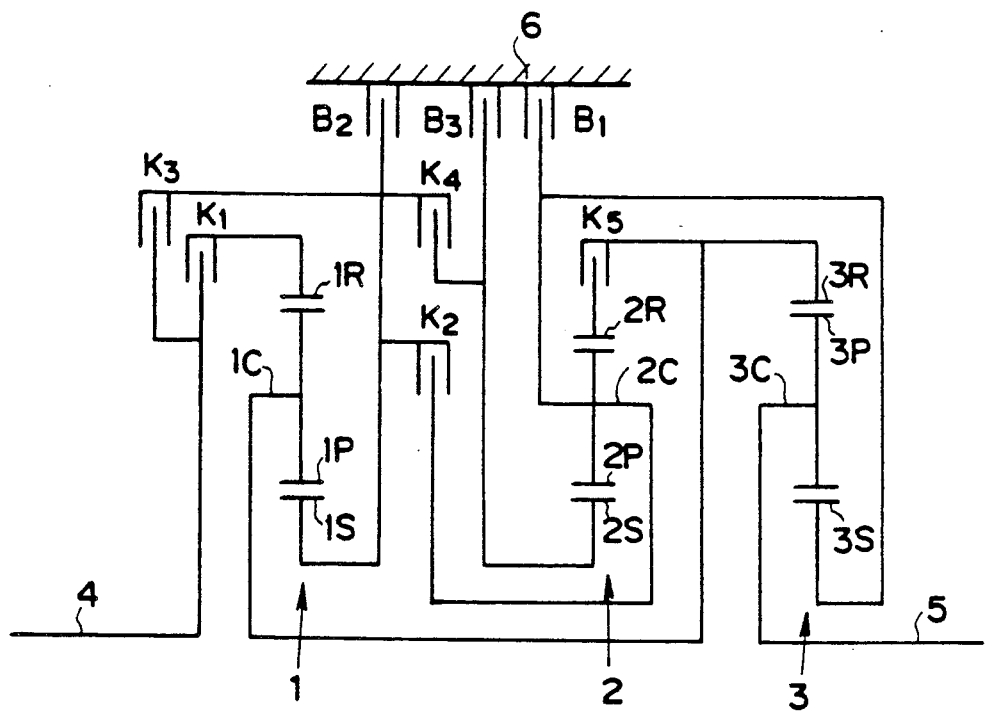

However, in the example shown in FIG. 1, as clear from Table 1, at the second gear and the third gear, the second planetary gear set 2 does not substantially contribute to the gear change. Therefore, in this case, it is desirable to reduce as much as possible the rotation of the elements of the second planetary gear set 2. The example shown in FIG. 2, from this viewpoint, releases the connection of the ring gear 2R of the second planetary gear set 2, the carrier 1C of the first planetary gear set 1, and the ring gear 3R of the third planetary gear set 3 in the second and third gears. That is, the construction shown in FIG. 2 is comprised of the construction shown in the afore-mentioned FIG. 1 except a fifth clutch means K5 is interposed between the ring gear 2R of the second planetary gear set 2, the carrier 1C of the first planetary gear set 1, and the ring gear 3R of the third planetary gear set 3 for connecting and releasing the same selectively. Even in the construction shown in FIG. 2, it is possible to set the various transmission speeds without causing any circulation of power. The operation table is shown in Table 2. Note that even in the succeeding embodiments, it is possible to set five to seven forward speeds and one reverse speed. In the operation tables shown in Table 2 on, the 2.5 gear and the 3.5th gear show the case based on the case of setting five forward speeds and one reverse speed plus these as additional transmission stages. If setting seven forward speeds and one reverse speed, the 2.5th gear corresponds to the third gear and the 3.5th gear to the fifth gear.

TABLE 2

| | Clutch means | | | | | Brake means | | |
| --- | --- | --- | --- | --- | --- | --- | --- | --- |
| | K1 | K2 | K3 | K4 | K5 | B1 | B2 | B3 |
| 1st | ○ | x | x | ○ | ○ | ○ | x | x |

TABLE 2-continued

|  | Clutch means | | | | | Brake means | | |
| --- | --- | --- | --- | --- | --- | --- | --- | --- |
|  | K1 | K2 | K3 | K4 | K5 | B1 | B2 | B3 |
| 2nd | ○ | x* | x | ○* | x* | ○* | ○* | x* |
| 3rd | ○ | x | ○ | ○*1 | x*1 | ○ | x | x*1 |
| 4th | ○*2 | ○*2 | ○*2 | ○*2 | ○*2 | x | x | x*2 |
| 5th | x | ○ | ○ | x | ○ | x | x | ○ |
| Rev | x | x | ○ | ○ | ○ | ○ | x | x |
| 2.5th | ○ | x | x | ○*3 | ○ | x | ○*3 | ○*3 |
| 3.5th | ○ | x | ○ | x | ○ | x | x | ○ |

*These states of engagement and release need not be as shown in the Table. The transmission stages may be set by several other combinations of states of engagement and release.
*1 Any one may be engaged.
*2 When engaging K1, K2, and K3, K4 and K5 may be additionally engaged or B3 may be engaged instead of K4 and K5. Further, in engaging K4 and K5, two or more of K1, K2, and K3 may be engaged.
*3 At least two of the three may be engaged.

Figure 3:
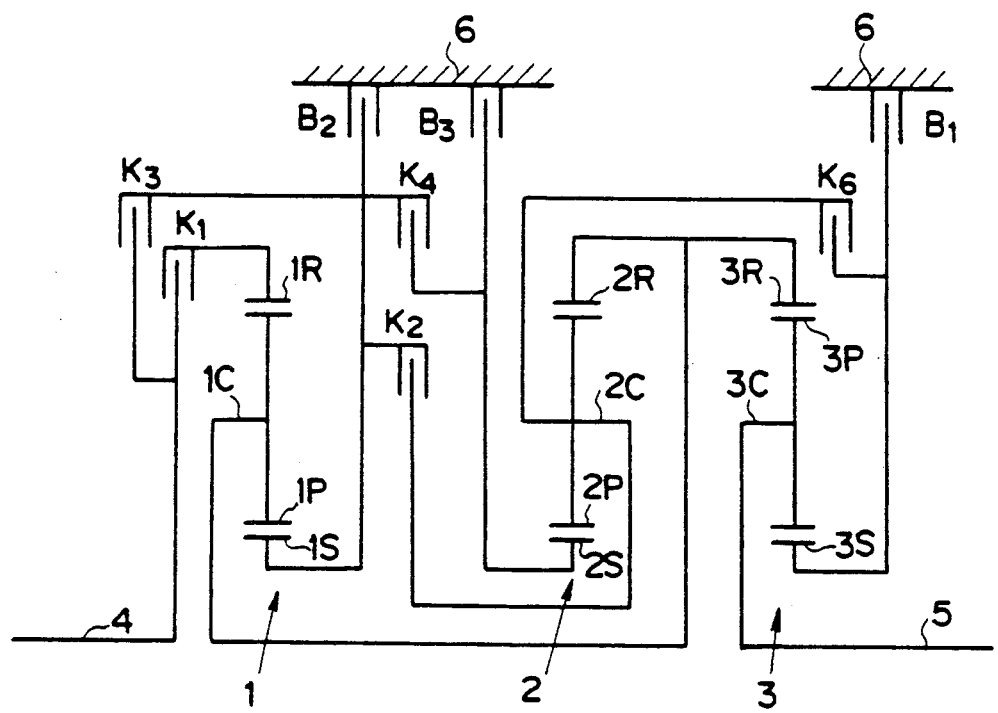

Further, in this embodiment, there is no particular need for the carrier 2C of the second planetary gear set 2 and the sun gear 2C of the second planetary gear set 3 to be connected at all times. The carrier 2C and the sun gear 3S may be connected and the connection released as needed. FIG. 3 shows an example of this. The construction shown here has a sixth clutch means K6 interposed between the carrier 2C of the second planetary gear set 2 and the sun gear 3S of the third planetary gear set 3 in the construction shown in FIG. 1. Further, the first brake means B1 is disposed between the sun gear 3S of the third planetary gear set 3 and the casing 6. Even in the automatic transmission of the construction shown here, no power circulation is caused. It is possible to set five forward speeds and one reverse speed or seven forward speeds and one reverse speed. The operation table is as shown in Table 3.

TABLE 3

|  | Clutch means | | | | Brake means | | |
| --- | --- | --- | --- | --- | --- | --- | --- |
|  | K1 | K2 | K3 | K4 | K6 | B1 | B2 | B3 |
| 1st | ○ | x | x | ○ | ○ | ○ | x | x |
| 2nd | ○ | x* | x | ○* | x* | ○* | ○* | x* |
| 3rd | ○ | x* | ○* | ○* | x* | ○ | x | x* |
| 4th | ○* | ○* | ○* | ○* | ○* | x | x | x |
| 5th | x | ○ | ○ | x | ○ | x | x | ○ |
| Rev | x | x | ○ | ○ | ○ | ○ | x | x |
| 2.5th | ○ | x | x | ○* | ○ | x | ○* | ○* |
| 3.5th | ○ | x | ○ | x | ○ | x | x | ○ |

*These states of engagement and release need not be as shown in the table. The transmission stages may be set by several other combinations of states of engagement and release. Examples are shown in FIG. 6.

Figure 4:
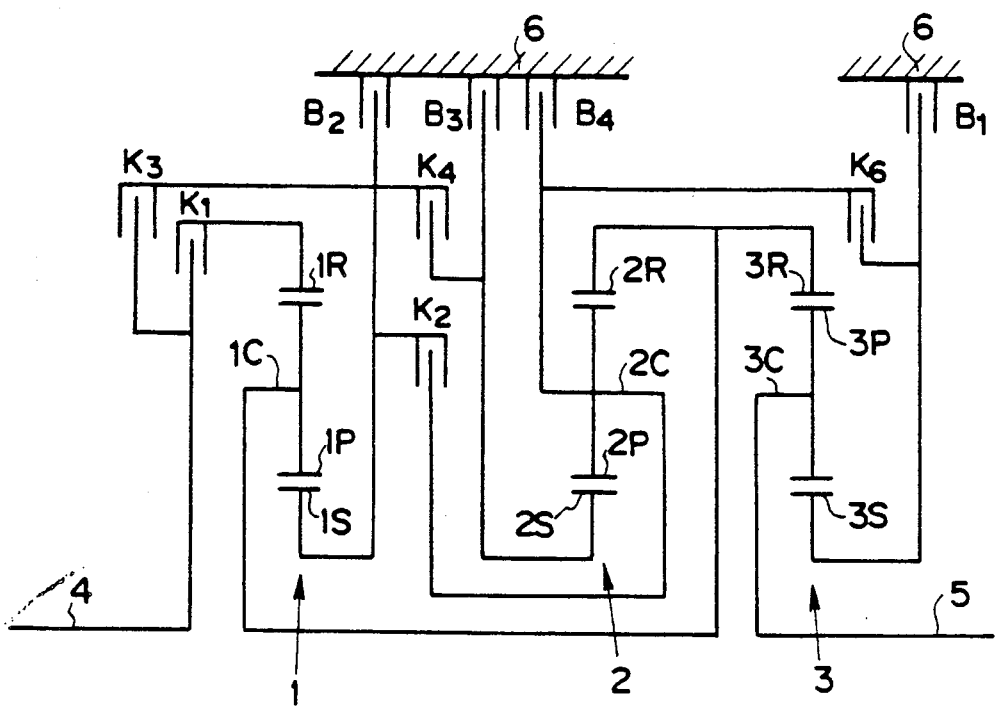

Along with additionally providing the above sixth clutch means K6, it is possible to further provide a brake means for independently holding stationary the carrier 2C of the second planetary gear set 2. Its construction is shown in FIG. 4. That is, the construction shown there is the construction shown in the above-mentioned FIG. 3 but with a fourth brake means B4 interposed between the carrier 2C of the second planetary gear set 2 and the casing 6. The operation table of the automatic transmission is as shown in Table 4. It is possible to set five forward speeds and one reverse speed or seven forward speeds and one reverse speed. Further, in the construction shown in FIG. 4, in the reverse gear, the sun gear 3S of the third planetary gear set 3 is held stationary by the first brake means B1 and the carrier 2C of the second planetary gear set 2 is held stationary by the fourth brake means B4. As a result, there is no load torque on the sixth clutch means K6 and the sixth clutch means K6 may be made small in capacity and size.

TABLE 4

|  | Clutch means | | | | Brake means | | | |
| --- | --- | --- | --- | --- | --- | --- | --- | --- |
|  | K1 | K2 | K3 | K4 | K6 | B1 | B2 | B3 | B4 |
| 1st | ○ | x | x | ○ | x* | ○* | x | x | ○* |
| 2nd | ○ | x* | x | ○* | x* | ○* | ○* | x* | x* |
| 3rd | ○* | x* | ○* | ○* | x* | ○* | x | x* | x* |
| 4th | ○* | ○* | ○* | ○* | ○ | x | x | x | x |
| 5th | x | ○ | ○ | x | ○ | x | x | ○ | x |
| Rev | x | x | ○ | ○ | x* | ○* | x | x | ○* |
| 2.5th | ○ | x | x | ○* | ○ | x | ○* | ○* | x |
| 3.5th | ○ | x | ○ | x | ○ | x | x | ○ | x |

*These states of engagement and release need not be as shown in the Table. The transmission stages may be set by several other combinations of states of engagement and release. Examples are shown in FIG. 6.

Figure 5:
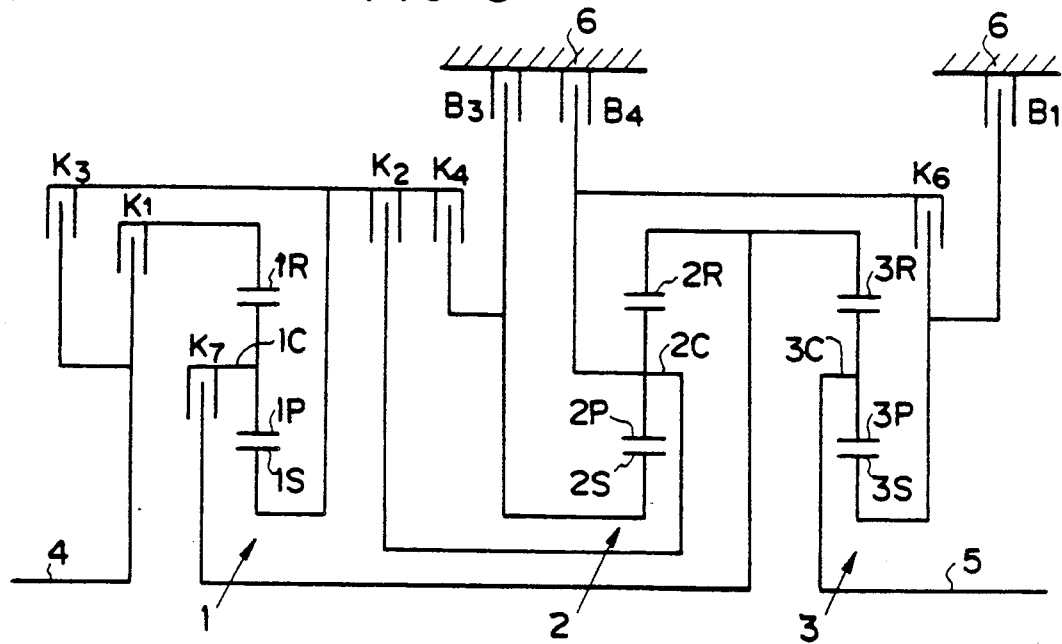

The example shown in FIG. 5 provides another clutch means (seventh clutch means K7) between the carrier 1C of the first planetary gear set 1 and the ring gears 2R and 3R of the second planetary gear set 2 and the third planetary gear set 3. An example of the operation table is shown in Table 5.

TABLE 5

|  | Clutch means | | | | | | Brake means | | |
| --- | --- | --- | --- | --- | --- | --- | --- | --- | --- |
|  | K1 | K2 | K3 | K4 | K6 | K7 | B1 | B3 | B4 |
| 1st | ○ | x | x | ○ | x* | ○ | ○ | x | ○* |
| 2nd | ○ | x* | x | ○* | x* | ○ | ○* | ○* | x* |
| 3rd | ○* | x* | ○* | ○* | x* | ○ | ○* | x* | x* |
| 4th | ○* | ○* | ○* | ○* | ○ | ○* | x | x | x |
| 5th | ○* | ○ | ○ | x | ○ | x* | x | ○ | x |
| Rev | ○* | x | ○ | ○ | x* | x* | ○* | x | ○* |
| 2.5th | ○ | x | x | ○ | ○ | ○* | x | ○ | x |
| 3.5th | ○ | x | ○ | x | ○ | ○* | x | ○ | x |

*These states of engagement and release need not be as shown in the Table. The transmission stages may be set by several other combinations of states of engagement and release.

As will be understood from Table 5, the first clutch means K1 may be set to be connected at all times, so the first clutch means K1 may be eliminated and the input shaft 4 and ring gear 1R of the first planetary gear set constructed to be connected at all times. In this case, the operation table is the same as the above Table 5 except for the deletion of the column for K1. Further, the patterns of combinations of engagement and release able to be performed for setting the various transmission stages are reduced in number by the deletion of the first clutch means K1.

The combinations of engagement and release of the clutch means and the brake means for setting the various transmission stages are summarized in FIG. 6. In FIG. 6, the small circle marks indicate engagement, the empty columns indicate release, and the asterisk marks indicate that engagement may be made. Further, FIG. 6 was prepared as the operation table for the automatic transmission of the construction shown in FIG. 4.

As will be understood from FIG. 6, the first brake means B1, the second brake means B2, and the fourth brake means B4 may be released in any of the transmission stages depending on the combination of engagement and release of other clutch means and brake means. Therefore, any one or two of the brake means B1, B2, and B4 may be eliminated. From FIG. 6, further, it will be possible to easily conceive of various modifications of the present invention.

However, in the above-mentioned embodiments, the clutch means K1 to K7 and the brake means B1 to B4 are shown as multi-disc clutches or multi-disc brakes, but in the present invention to facilitate control for the transmission and to ease the shock, use may be made of an engagement means having one-way properties for the clutch means and brake means. Here, an "engagement means having one-way properties" includes a well known one-way clutch provided with a sprag or other rollers, a band brake with differing torque capacities in different directions of load, etc. This type of one-way engagement means may be used alone or together with multi-disc clutches or multi-disc brakes so as to enable reduction of the number of engagement means to be controlled to switch to engage or release during gear changes. Further, the shock is improved since the engagement and release states are automatically switched between by changes of the load torque. To cause such an action, the members connected by the one-way engagement means rotate once (including idle state) just before the gear change and rotate relatively after the gear change. Further, it is necessary that the members performing the gear change deal with the torque transmission before the gear change. Further, the location for interposing the one-way engagement means may, in addition to being between the two elements directly connected by the one-way engagement means, be between two elements connected through another element performing the same rotation before the speed change. Note that the location for providing the one-way engagement means differs in the case of providing a clutch means (sixth clutch means K6) which selectively connects the carrier 2C of the second planetary gear set 2 and the sun gear 3S of the third planetary gear set 3 and the case of not providing such a clutch. Further, it differs for each transmission pattern, including so-called jump over gear changes in addition to changes to adjoining transmission stages. Below, an example will be shown of the location for providing a one-way engagement means in the case of providing a sixth clutch means K6 as shown in FIG. 3 to FIG. 5.

Regarding gear changes between the first and second gears, a one-way clutch or other one-way engagement means may be interposed between at least one of the sun gear 1S of the first planetary gear set 1 and the sun gear 2S of the second planetary gear set 2, the carrier 2C of the second planetary gear set 2 and the sun gear 3S of the third planetary gear set 3, and the carrier 2C of the second planetary gear set 2 and the casing 6. Regarding gear changes between the first gear and the 2.5th gear, a one-way engagement means may be provided between at least one of the carrier 2C of the second planetary gear set 2 and the casing 6 and the carrier 3S of the third planetary gear set 3 and the casing 6. Regarding gear changes between the first and third gears, a one-way engagement means may be provided between at least one of the sun gear 1S of the first planetary gear set 1 and the sun gear 2S of the second planetary gear set 2, the carrier 2C of the second planetary gear set 2 and the sun gear 3S of the third planetary gear set 3, and the carrier 2C of the second planetary gear set 2 and the casing 6. Regarding gear changes between the first and 3.5th gears, a one-way engagement means may be interposed between at least one of the sun gear 1S of the first planetary gear set 1 and the sun gear 2S of the second planetary gear set 2, the carrier 2C of the second planetary gear set 2 and the casing 6, and the sun gear 3S of the third planetary gear set 3 and the casing 6. Note that in this case, there are transmission patterns where the gear change must be performed by simultaneously switching three or more engagement means. Regarding the gear change between the first gear and the fourth gear, a one-way engagement means may be interposed between at least one of the carrier 2C of the second planetary gear set 2 and the casing 6 and the sun gear 3S of the third planetary gear set 3 and casing 6. Regarding gear changes between the first gear and the fifth gear, a one-way engagement means may be interposed between at least one of the sun gear 1S of the first planetary gear set 1 and the carrier 2S of the second planetary gear set 2, the carrier 2C of the second planetary gear set 2 and the casing 6, the sun gear 3S of the third planetary gear set 3 and the casing 6, and the ring gear 1R of the first planetary gear set 1 and the input shaft 4. Note that even in this case, there are transmission patterns requiring gear changes where three or more engagement means are simultaneously switched.

Regarding gear changes between the second gear and the 2.5th gear, a one-way engagement means may be interposed between at least one of the sun gear 1S of the first planetary gear set 1 and the sun gear 3S of the third planetary gear set 3 and the sun gear 3S and the casing 6. Regarding gear changes between the second gear and the third gear, a one-way engagement means may be interposed between at least one of the sun gear 1S of the first planetary gear set 1 and the sun gear 3S of the third planetary gear set 3 and the sun gear 1S of the first planetary gear set 1 and the casing 6. Regarding gear changes between the second and 3.5th gears, a one-way engagement means may be interposed between at least one of the sun gear 1S of the first planetary gear set 1 and the sun gear 3S of the third planetary gear set 3, the sun gear 1S of the first planetary gear set 1 and the casing 6, and the sun gear 3S of the third planetary gear set 3 and the casing 6. In this case, there are transmission patterns which require gear changes where three or more engagement means are simultaneously switched. Regarding gear changes between the second gear and the fourth gear, a one-way engagement means may be interposed between at least one of the sun gear 1S of the first planetary gear set 1 and the casing 6 and the sun gear 3S of the third planetary gear set 3 and the casing 6. Regarding gear changes between the second gear and the fifth gear, a one-way engagement means may be interposed between at least one of the sun gear 1S of the first planetary gear set 1 and the casing 6, the sun gear 3S of the third planetary gear set 3 and the casing 6, and the ring gear 1R of the first planetary gear set 1 and the input shaft 4. In this case too, there are transmission patterns which require gear changes where three or more engagement means are simultaneously switched.

Regarding gear changes between the 2.5th gear and the third gear, a one-way engagement means may be interposed between at least one of the sun gear 1S of the first planetary gear set 1 and the sun gear 2S of the second planetary gear set 2, the carrier 1S of the first planetary gear set 1 and the casing 6, and the sun gear 2S of the second planetary gear set 2 and the casing 6. In this case too, there are transmission patterns which require gear changes where three or more engagement means are simultaneously switched. Regarding gear changes between the 2.5th gear and the 3.5th gear, a one-way engagement means may be interposed between at least one of the sun gear 1S of the first planetary gear set 1 and sun gear 2S of the second planetary gear set 2 and the sun gear 1S of the first planetary gear set 1 and the casing 6. Regarding gear changes between the 2.5th gear and the fourth gear, a one-way engagement means may be interposed between at least one of the sun gear 1S of the first planetary gear set 1 and the casing 6 and the sun gear 2S of the second planetary gear set 2 and the casing 6. Regarding gear changes between the 2.5th gear and the fifth gear, a one-way engagement means may be interposed between at least one of the sun gear 1S of the first planetary gear set 1 and the sun gear 2S of the second planetary gear set 2, the sun gear 1S of the first planetary gear set 1 and the casing 6, and the ring gear 1R of the first planetary gear set 1 and the input shaft 4. In this case too, there are transmission patterns which require gear changes where three or more engagement means are simultaneously switched.

Regarding the gear changes between the third and 3.5th gears and between the third and fourth gears, a one-way engagement means may be interposed between the sun gear 3S of the third planetary gear set 3 and the casing 6. Regarding gear changes between the third gear and the fifth gear, a one-way engagement means may be interposed between at least one of the sun gear 3S of the third planetary gear set 3 and the casing 6, the sun gear 1S, carrier 1C, or ring gear 1R of the first planetary gear set 1 and the ring gear 3R of the third planetary gear set 3, and the carrier 1C or the ring gear 1R of the first planetary gear set 1 and the ring gear 3R of the third planetary gear set 3. In this case too, there are transmission patterns which require gear changes where three or more engagement means are simultaneously switched.

Regarding gear changes between the 3.5th gear and the fourth gear, a one-way engagement means may be interposed between the sun gear 2S of the second planetary gear set 2 and the casing 6. Regarding gear changes between the 3.5th gear and the fifth gear, a one-way engagement means may be interposed between at least of one of the sun gear 1S, carrier 1C, or ring gear 1R of the first planetary gear set 1 or the ring gear 2R of the second planetary gear set 2 or the ring gear 3R of the third planetary gear set 3; and the input shaft 4 and the carrier 1C or ring gear 1R of the first planetary gear set 1 or the ring gear 2R of the second planetary gear set 2 or the ring gear 3R of the third planetary gear set 3.

Regarding gear changes between the fourth gear and the fifth gear, all of the gear train rotates as one at fourth gear, so it is possible to provide a one-way engagement means for each of the planetary gear sets 1, 2, and 3. That is, regarding the sun gear 1S of the first planetary gear set 1, a one-way engagement means may be interposed between one of the carrier 1C and ring gear 1R of the first planetary gear set 1, the sun gear 2S and ring gear 2R of the second planetary gear set 2, and the carrier 3C and ring gear 3R of the third planetary gear set 3. Regarding the carrier 1C of the first planetary gear set 1, a one-way engagement means may be interposed between the ring gear 2R of the second planetary gear set 2 and the ring gear 3R of the third planetary gear set 3 and any members (including the input shaft 4) other than the casing 6. Regarding the ring gear 1R of the first planetary gear set 1 and the sun gear 2S of the second planetary gear set 2, a one-way engagement means may be interposed between any members (including the input shaft 4) other than the casing 6. Regarding the carrier 2C of the second planetary gear set 2, a one-way engagement means may be interposed between any of the carrier 1C and ring gear 1R of the first planetary gear set 1, the sun gear 2S and ring gear 2R of the second planetary gear set 2, and the carrier 3C and ring gear 3R of the third planetary gear set 3. Regarding the ring gear 2R of the second planetary gear set 2, a one-way engagement means may be interposed between the carrier 1C of the first planetary gear set 1 and the ring gear 3R of the third planetary gear set 3 and any members (including the input shaft 4) other than the casing 6. Regarding the sun gear 3S of the third planetary gear set 3, a one-way engagement means may be interposed between any of the carrier 1C and ring gear 1R of the first planetary gear set 1, the sun gear 2S and ring gear 2R of the second planetary gear set 2, and the carrier 3C and ring gear 3R of the third planetary gear set 3. Regarding the carrier 3C of the third planetary gear set 3, a one-way engagement means may be interposed between the carrier 3C and any members (including the input shaft 4) other than the casing 6. Regarding the ring gear 3R of the third planetary gear set 3, a one-way engagement means may be interposed between the carrier 1C of the first planetary gear set 1 and the ring gear 2R of the second planetary gear set 2 and also any members (including the input shaft 4) other than the casing 6.

Note that in the construction such as shown in FIG. 1 and FIG. 2 where no sixth clutch means K6 is provided, but the carrier 2C of the second planetary gear set 2 and the sun gear 3S of the third planetary gear set 3 are normally connected, the locations where the one-way engagement means can be provided are more limited than in the above case, e.g., the one-way engagement means cannot be provided between the two. The installable location may be suitably selected.

Further, as the way of using the one-way engagement means, it is possible to use the method disclosed in the specification and drawings attached to Japanese Patent Application Nos. 63-17627 and 63-221670 filed by the same assignee. An example of the engagement means with such an improvement is shown below.

Figure 7:
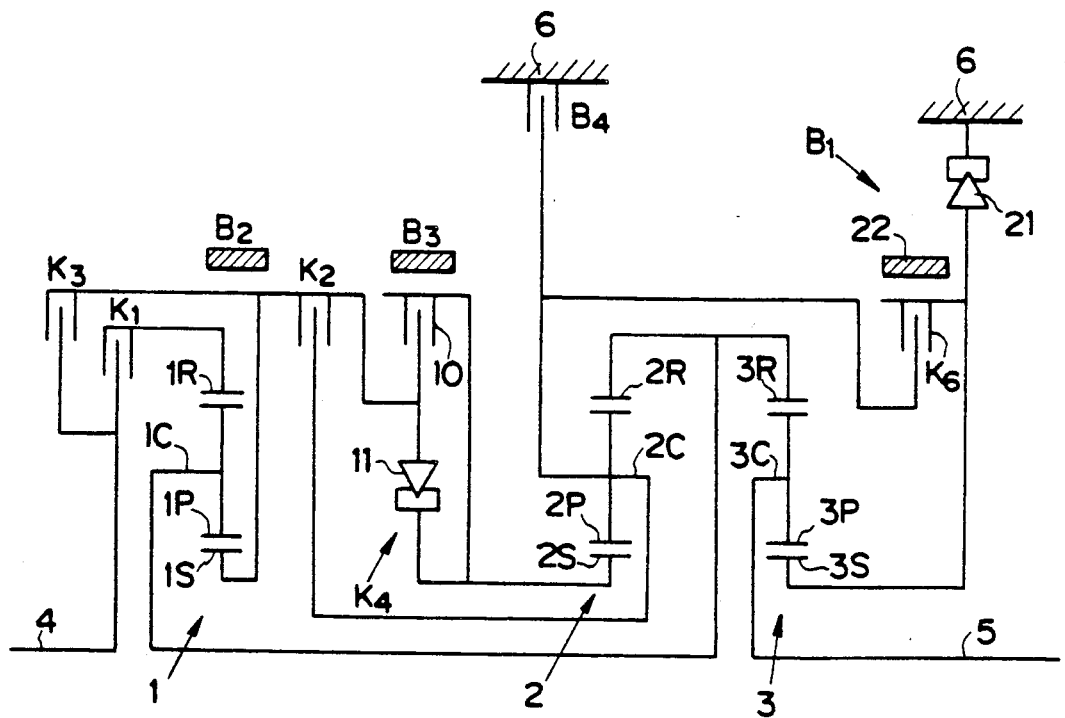

In the example shown in FIG. 7, the fourth clutch means K4 in the construction shown in FIG. 4 mentioned earlier is constituted by a multi-disc clutch 10 and a one-way clutch 11 in a mutually parallel relationship, the first brake means B1 is constructed by a one-way clutch 21 disposed between the sun gear 3S of the third planetary gear set 3 and the casing 6 and a band brake 22 in a parallel relationship with the one-way clutch 21, the second brake means B2 and the third brake means B3 are constituted by band brakes, and the other engagement means are multi disc structures. An example of the operation table of the automatic transmission shown in FIG. 7 is given in Table 6. Note that in the following operation table, the circle marks indicate the engagement state and the x marks the release state, the same as in the previous operation tables, and, in addition, in the table, the double circle marks indicates the state of engagement during engine braking. Further, in the transmission stage column, the indications a, b, and c show other combinations of engagement and release for setting the corresponding transmission stage. In executing the gear change, one may change the combinations of engagement and release in the order of the letters or select any one of the combinations of engagement and release.

TABLE 6

|  | Clutch means | | | | | | Brake Means | | | | |
|---|---|---|---|---|---|---|---|---|---|---|---|
|  | | | | K4 | | | B1 | | | | |
|  | K1 | K2 | K3 | 10 | 11 | K6 | 22 | 21 | B2 | B3 | B4 |
| 1st | ○ | x | x | ⊙ | ○ | x | ⊙ | ○ | x | x | ○ |
| 2nd | | | | | | | | | | | |
| a | ○ | x | x | x | x | x | ⊙ | ○ | ○ | x | ○ |
| b | ○ | x | x | ○ | x | x | ⊙ | ○ | ○ | ○ | x |
| c | ○ | x | x | ⊙ | ○ | x | ⊙ | ○ | x | ○ | x |
| 3rd | | | | | | | | | | | |

TABLE 6-continued

| | Clutch means | | | | | | Brake Means | | | | |
|---|---|---|---|---|---|---|---|---|---|---|---|
| | | | | K4 | | | B1 | | | | |
| | K1 | K2 | K3 | 10 | 11 | K6 | 22 | 21 | B2 | B3 | B4 |
| a | o | x | o | x | x | x | ⊙ | o | x | o | x |
| b | o | x | o | o | x | x | ⊙ | o | x | x | x |
| 4th | | | | | | | | | | | |
| a | o | x | o | o | x | o | x | x | x | x | x |
| b | o | o | o | o | x | o | x | x | x | x | x |
| c | x | o | o | ⊙ | o | o | x | x | x | o | x |
| 5th | x | o | o | x | x | o | x | x | x | o | x |
| Rev | x | x | o | o | x | x | o | x | x | x | o |
| 2.5th | o | x | x | ⊙ | o | o | x | x | x | o | x |
| 3.5th | o | x | o | x | x | o | x | x | x | o | x |

Figure 8:
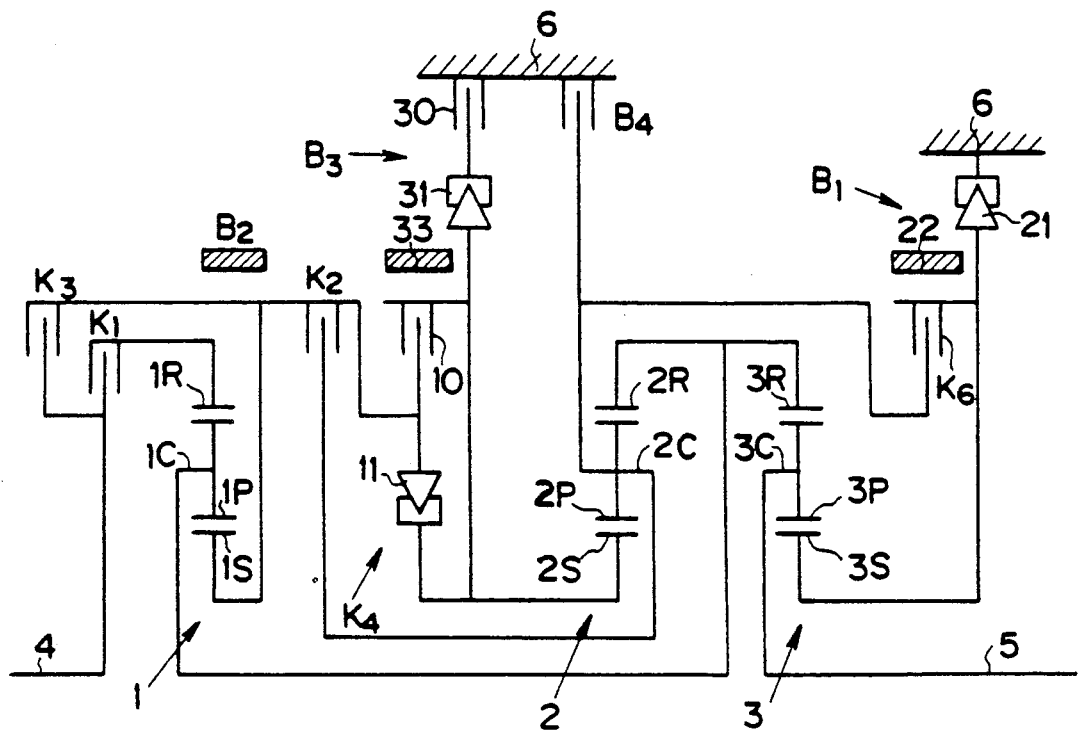

The example shown in FIG. 8 is the same in construction as that shown in FIG. 7 except that in the construction shown in FIG. 7, the third brake means B3 is replaced with a construction including a series relationship multi-disc brake 30 and a one-way clutch 31 and, in a parallel relationship with combinations of the same, a band brake 33. An example of the operation table is shown in Table 7.

TABLE 7

| | Clutch means | | | | | | Brake means | | | | | | |
|---|---|---|---|---|---|---|---|---|---|---|---|---|---|
| | | | | K4 | | | B1 | | | B3 | | | |
| | K1 | K2 | K3 | 10 | 11 | K6 | 22 | 21 | B2 | 33 | 30 | 31 | B4 |
| 1st | o | x | x | ⊙ | o | x | ⊙ | o | x | x | x | x | o |
| 2nd | | | | | | | | | | | | | |
| a | o | x | x | x | x | x | ⊙ | o | o | x | x | x | o |
| b | o | x | x | o | x | x | ⊙ | o | o | o | x | x | x |
| c | o | x | x | o | x | x | ⊙ | o | x | ⊙ | o | o | x |
| 3rd | o | x | o | o | x | x | ⊙ | o | x | x | o | x | x |
| 4th | | | | | | | | | | | | | |
| a | o | x | o | o | x | o | x | x | x | x | o | x | x |
| b | o | o | o | o | x | o | x | x | x | x | o | x | x |
| c | x | o | o | ⊙ | o | o | x | x | x | x | o | x | x |
| 5th | x | o | o | x | x | o | x | x | x | o | o | x | x |
| Rev | x | x | o | o | x | x | o | x | x | x | x | x | o |
| 2.5th | o | x | x | ⊙ | o | o | x | x | x | ⊙ | o | o | x |
| 3.5th | o | x | o | x | x | o | x | x | x | ⊙ | o | o | x |

Figure 9:
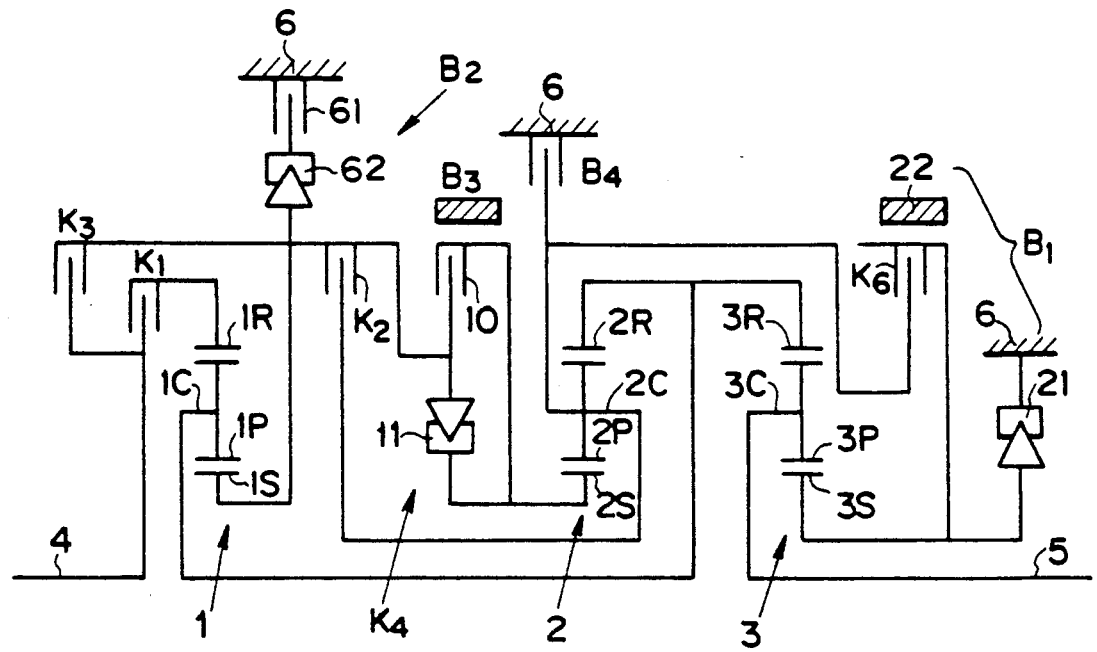

The example shown in FIG. 9 constitutes the second brake means B2 of the construction shown in FIG. 7 by a one-way clutch 62 and a multi-disc brake 61 arranged in a mutually series relationship between the sun gear 1S of the first planetary gear set 1 and the casing 6. The rest of the construction is the same as that shown in FIG. 7. An example of the operation table is shown in Table 8.

TABLE 8

| | Clutch means | | | | | | Brake means | | | | | |
|---|---|---|---|---|---|---|---|---|---|---|---|---|
| | | | | K4 | | | B1 | | B2 | | | |
| | K1 | K2 | K3 | 10 | 11 | K6 | 22 | 21 | 61 | 62 | B3 | B4 |
| 1st | o | x | x | ⊙ | o | x | ⊙ | o | x | x | x | o |
| 2nd | | | | | | | | | | | | |
| a | o | ⊙ | x | x | x | x | ⊙ | o | o | o | x | o |
| b | o | x | x | o | x | x | ⊙ | o | o | o | ⊙ | x |
| 3rd | o | x | o | o | x | x | ⊙ | o | o | o | x | x |
| 4th | | | | | | | | | | | | |
| a | o | x | o | o | x | o | x | x | o | x | x | x |
| b | o | o | o | o | x | o | x | x | o | x | x | x |
| c | x | o | o | ⊙ | o | o | x | x | o | x | x | x |
| 5th | x | o | o | x | x | o | x | x | o | x | o | o |
| Rev | x | x | o | o | x | x | o | x | x | x | x | o |
| 2.5th | o | x | x | ⊙ | o | o | x | x | o | x | o | x |
| 3.5th | o | x | o | x | x | o | x | x | o | x | o | x |

Figure 10:
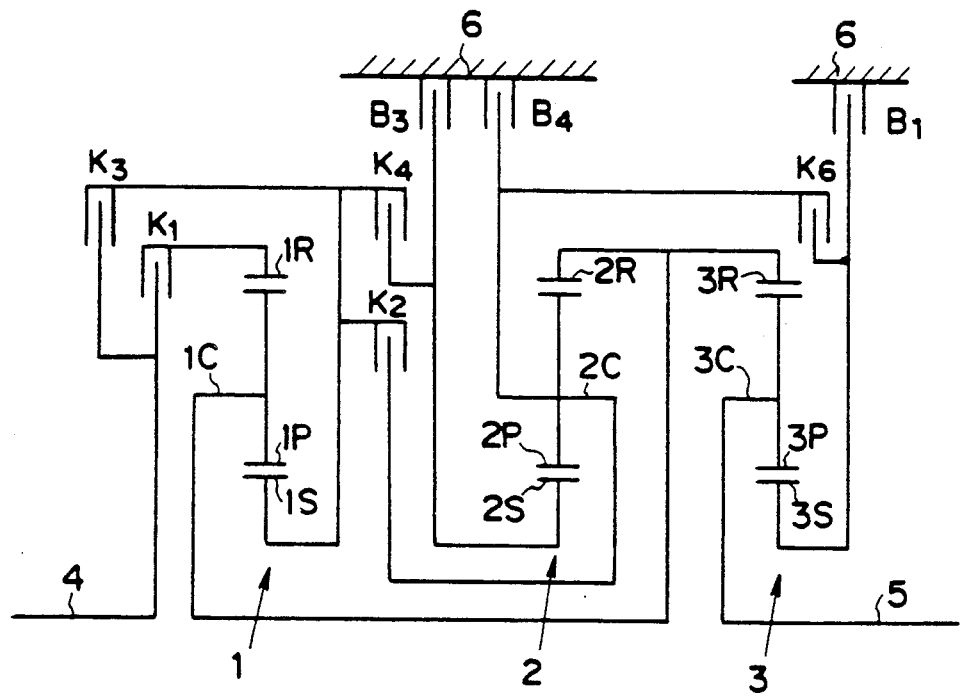

The embodiment shown in FIG. 10 is similar to that shown in FIG. 4, expect that the second brake means B2 is removed. The fourth brake means B4 in the automatic transmission shown in FIG. 10 consists of a multi-disc brake for selectively preventing the second carrier 2C from the forward and reverse rotation. Table 9 shows the operation of this embodiment in FIG. 10.

TABLE 9

| | Clutch means | | | | | Brake means | | |
|---|---|---|---|---|---|---|---|---|
| | K1 | K2 | K3 | K4 | K6 | B1 | B3 | B4 |
| 1st | o | x | x | o | o* | o* | x | o* |
| 2nd | o | x* | x | o* | x* | o* | o* | x* |
| 3rd | o* | x* | o* | o* | x* | o* | x* | x* |
| 4th | o* | o* | o* | o* | o* | x | x | x |
| 5th | x | o | o | x | o | x | o | x |
| Rev | x | x | o | o | x* | o* | x | o* |
| 2.5th | o | x | x | o | o | x | o | x |
| 3.5th | o | x | o | x | o | x | o | x |

*These states of engagement and release need not be as shown in the Table. The transmission stages may be set by several other combinations of states of engagement and release. Examples are shown in FIG. 6.

Figure 11:
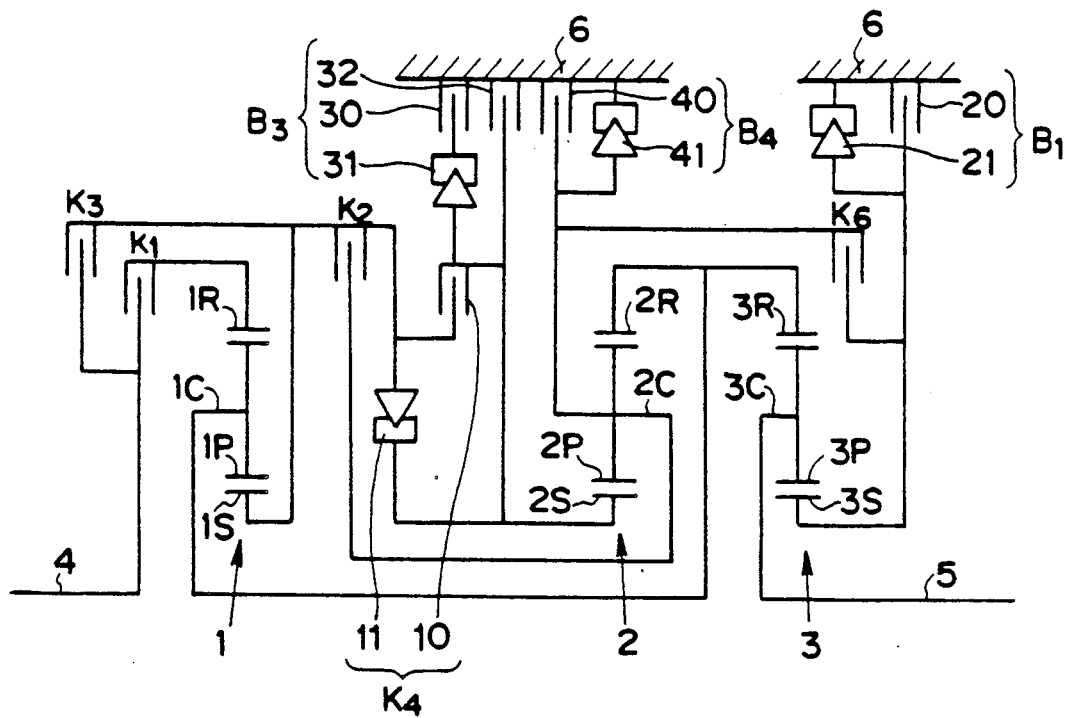
Figure 12:
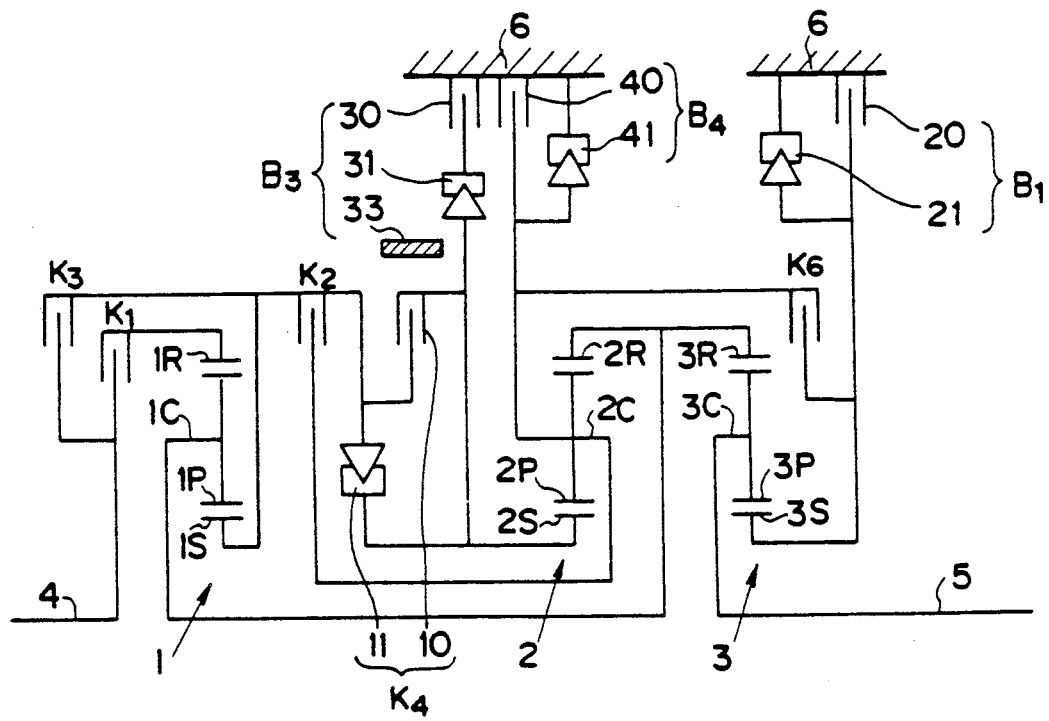
Figure 13:
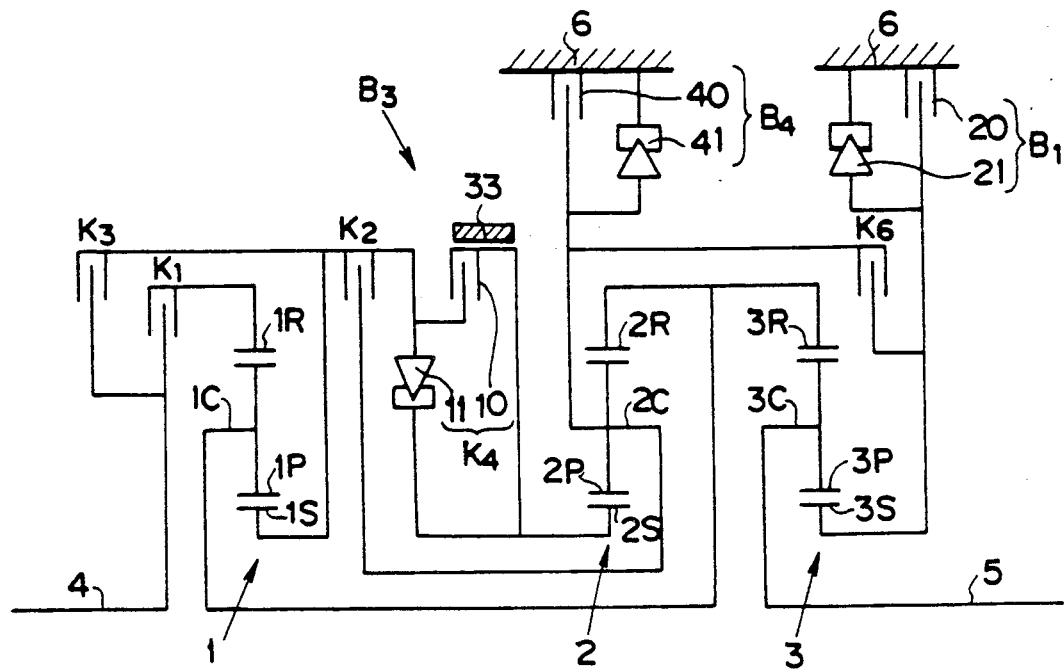

Further embodiments are shown in FIGS. 11, 12 and 13. These embodiments show improvements of the engagement means in the embodiment shown in FIG. 10. That is, the example shown in FIG. 11 comprises the constitution shown in FIG. 10 except the fourth clutch means K4 composed of a multi-disc clutch 10 and one-way clutch 11 in a parallel relationship, the first brake means B1 composed of the multi-disc brake 20 and one-way clutch 21 in a parallel arrangement, the third brake means B3 composed of the multi-disc brake 30 and one-way clutch 31 in a series arrangement and the multi-disc brake 32 in a parallel arrangement with the same, and the fourth brake means B4 composed of the multi-disc brake 40 and one-way clutch 41 in a parallel arrangement. Table 10 shows an example of the operation of the automatic transmission of the construction shown in FIG. 11.

TABLE 10

| | Clutch means | | | | | | Brake means | | | | | | |
|---|---|---|---|---|---|---|---|---|---|---|---|---|---|
| | | | | K4 | | | B1 | | B3 | | | B4 | |
| | K1 | K2 | K3 | 10 | 11 | K6 | 20 | 21 | 32 | 30 | 31 | 40 | 41 |
| 1st | o | x | x | ⊙ | o | x | ⊙ | o | x | x | x | x | o |
| 2nd | o | x | x | ⊙ | o | x | ⊙ | o | ⊙ | o | o | x | x |
| 3rd | o | x | o | o | x | x | ⊙ | o | x | o | x | x | x |
| 4th | | | | | | | | | | | | | |
| a | o | x | o | o | x | o | x | x | x | o | x | x | x |
| b | o | o | o | o | x | o | x | x | x | o | x | x | x |
| c | x | o | o | ⊙ | o | o | x | x | x | o | x | x | x |
| 5th | x | o | o | x | x | o | x | x | o | o | x | x | x |
| Rev | x | x | o | o | x | x | x | x | x | x | x | o | x |
| 2.5th | o | x | x | ⊙ | o | o | x | x | ⊙ | o | o | x | x |
| 3.5th | o | x | o | x | x | o | x | x | ⊙ | o | o | x | x |

The example shown in FIG. 12 is comprised of the constitution shown in FIG. 11 except the multi-disc brake 32 in the third brake means B3 replaced by a band brake 33. The operational table is the same as Table 10 except the number 32 in the column B3 replaced with 33.

The example shown in FIG. 13 is comprised of the constitution shown in the above-mentioned FIG. 12 except the third brake means B3 composed only of the band brake 33. Table 11 shows an example of the operational table of the same.

TABLE 11

| | Clutch means | | | | | | Brake means | | | | |
|---|---|---|---|---|---|---|---|---|---|---|---|
| | | | | K4 | | | B1 | | | B4 | |
| | K1 | K2 | K3 | 10 | 11 | K6 | 20 | 21 | B3 | 40 | 41 |
| 1st | o | x | x | ⊙ | o | x | ⊙ | o | x | ⊙ | o |

TABLE 11-continued

| | Clutch means | | | | | | Brake means | | | | |
|---|---|---|---|---|---|---|---|---|---|---|---|
| | | | | K4 | | | B1 | | | B4 | |
| | K1 | K2 | K3 | 10 | 11 | K6 | 20 | 21 | B3 | 40 | 41 |
| 2nd | o | x | x | (o) | o | x | (o) | o | o | x | x |
| 3rd | | | | | | | | | | | |
| a | o | x | o | x | x | x | (o) | o | o | x | x |
| b | o | x | o | o | x | x | (o) | o | x | x | x |
| 4th | | | | | | | | | | | |
| a | o | x | o | o | x | o | x | x | x | x | x |
| b | o | o | o | o | x | o | x | x | x | x | x |
| c | x | o | o | (o) | o | o | x | x | x | x | x |
| 5th | x | o | o | x | x | o | x | x | x | x | x |
| Rev | x | x | o | o | x | x | o | x | x | o | x |
| 2.5th | o | x | x | (o) | o | o | x | x | o | x | x |
| 3.5th | o | x | o | x | x | o | x | x | o | x | x |

Above, an explanation was made of the invention using a first to 12th embodiment, but the invention is not of course limited to the embodiments. The connection between components in the planetary gear sets may be constant or may be selective using a clutch or other engagement means. Further, the member connecting the input shaft and the output shaft and the member to be held stationary may be suitably determined in accordance with need. Also, in the present invention, the one-way clutch or other one-way engagement means may be used for either of the clutch means or brake means or used for a plurality of clutch means or brake means.

Here, summarizing the advantages obtained from the present invention, the invention prevents the increase in the capacity required for the clutch means and the increase in the size of the automatic transmission itself since there is no clutch means in which the load torque would become particularly large. There are a number of patterns of combinations of clutch means and brake means for engagement for setting the desired transmission stage, so the degree of freedom in transmission control rises as well.

What is claimed is:

1. An automatic transmission for changing the speed of rotation of an input shaft and transmitting the rotation to an output shaft by a gear train comprising three single pinion type planetary gear sets, said automatic transmission comprising:
   a first planetary gear set having a first sun gear, a first ring gear, and a first carrier holding pinion gears meshing with the first sun gear and the first ring gear,
   a second planetary gear set having a second sun gear, a second ring gear connected to said first carrier, and a second carrier holding pinion gears meshing with the second sun gear and the second ring gear,
   a third planetary gear set having a third sun gear selectively connected to said second carrier, a third ring gear normally connected to said first carrier, and a third carrier holding pinion gears meshing with the third sun gear and the third ring gear and connected to the output shaft,
   a first clutch means for selectively connecting said input shaft and the first ring gear,
   a second clutch means for selectively connecting the first sun gear and the second carrier,
   a third clutch means for selectively connecting the input shaft and the first sun gear,
   a fourth clutch means for selectively connecting the first sun gear and the second sun gear,
   a fifth clutch means for selectively connecting the second carrier and the third sun gear,
   a first brake means for selectively stopping the rotation of the third sun gear,
   a second brake means for selectively stopping the rotation of the second sun gear,
   a third brake means for selectively stopping the rotation of the second carrier,
   wherein at least five forward speeds and one reverse speed are settable as transmission stages, and
   a casing accommodating said gear train,
   wherein the first brake means comprises a one-way clutch disposed between the third sun gear and the casing and a multi-disc brake arranged in a parallel relationship with the one-way clutch.

2. An automatic transmission for changing the speed of rotation of an input shaft and transmitting the rotation to an output shaft by a gear train comprising three single pinion type planetary gear sets, said automatic transmission comprising:
   a first planetary gear set having a first sun gear, a first ring gear, and a first carrier holding pinion gears meshing with the first sun gear and the first ring gear,
   a second planetary gear set having a second sun gear, a second ring gear normally or selectively connected to said first carrier, and a second carrier holding pinion gears meshing with the second sun gear and the second ring gear,
   a third planetary gear set having a third sun gear normally or selectively connected to said second carrier, a third ring gear normally connected to said first carrier, and a third carrier holding pinion gears meshing with the third sun gear and the third ring gear and connected to the output shaft,
   a first clutch means for selectively connecting said input shaft and the first ring gear,
   a second clutch means for selectively connecting the first sun gear and the second carrier,
   a third clutch means for selectively connecting the input shaft and the first sun gear,
   a fourth clutch means for selectively connecting the first sun gear and the second sun gear,
   a first brake means for selectively stopping the rotation of at least one of the third sun gear and the second carrier,
   a second brake means for selectively stopping the rotation of the second sun gear,
   a casing accommodating the gear train,
   a one-way clutch disposed between the second carrier and the casing, and
   a multi-disc brake arranged in parallel relationship with the one-way clutch,
   wherein at least five forward speeds and one reverse speed are settable as transmission stages.

3. An automatic transmission according to claim 2, wherein the fourth clutch means comprises a one-way clutch and a multi-disc clutch in a mutually parallel relationship.

4. An automatic transmission according to claim 2, wherein there are a plurality of combinations of the clutch means and the brake means to provide engagement for setting any one transmission stage.

5. An automatic transmission according to claim 2, further comprising a casing accommodating said gear train,
   wherein the first brake means comprises a one-way clutch disposed between the third sun gear and the casing and a multi-disc brake arranged in parallel relationship with the one-way clutch.

6. An automobile transmission according to claim 2, wherein the second brake means comprises a band brake.

* * * * *